Patented Sept. 10, 1940

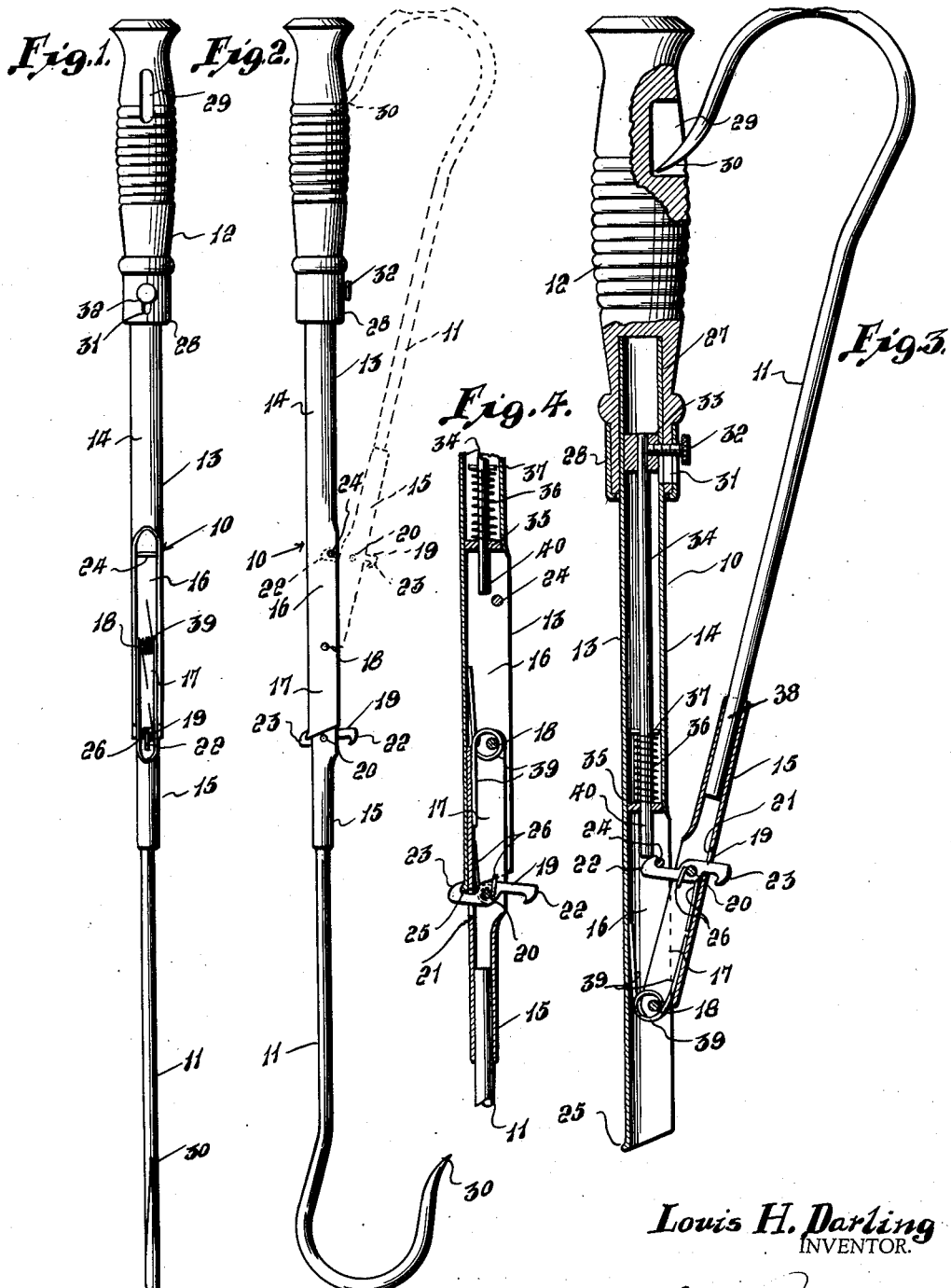

2,214,660

UNITED STATES PATENT OFFICE 2,214,660

GAFF HOOK

Louis H. Darling, Vallejo, Calif., assignor to Robert H. Allen, A. M. Yohner, and Peter J. Wallace, general partners, and Romildo Lagorio, Angelo Lagorio, Roy Tucker, Morris Clancy, L. C. Robinson, J. W. Ensign, A. R. Powers, Harry Minatel, Harry Arbios, Elmer Bruce, L. H. Darling, and Louise Railey, limited partners, doing business under the firm name and style of Fol-Gaf Limited, Stockton, Calif.

Application February 24, 1938, Serial No. 192,410
Renewed February 21, 1940

11 Claims. (Cl. 43—5)

This invention relates to an improved folding gaff hook.

It is an aim of this invention to provide a folding gaff hook which may be rigidly retained in an extended or folded position, and having means whereby the bill of the hook will be covered when folded so that the article may be handled with safety.

Another object of the invention is to provide a device which may be readily packed in a small space.

More particularly it is an aim of this invention to provide a folding gaff hook which will be economical to manufacture, being of a simple yet durable construction, and employing a novel form of latch having the dual function of retaining the hook in an open or a closed position.

Still a further object of the invention is to provide means to manually release the latch member when the hook is in a folded position, and spring means to urge the hook to an open position to be automatically latched and rigidly held ready for use.

Other objects and advantages of the invention will hereinafter become more fully apparent from the following description of the drawing, which illustrates a preferred form of the invention, and wherein:

Figure 1 is a front elevational view of the device in an open position,

Figure 2 is a side elevational view of the same, with the hook shown in dotted lines in a folded position, Figure 3 is an enlarged vertical sectional view, partly in elevation showing the hook in a folded position, and Figure 4 is a fragmentary vertical sectional view of the intermediate portion of the shank latched in an open position.

Referring more particularly to the drawing wherein like reference characters designate like or corresponding parts throughout the different views, 10 designates generally the gaff hook in its entirety comprising the hook 11, handle 12, and shank 13.

The shank 13 comprises the sections 14 and 15 which are preferably tubular in shape except at their adjacent ends 16 and 17 where they are open at their tops and substantially U-shape in cross section. Section 15 is substantially smaller than section 14 to permit portion 17 to be mounted in portion 16 as best seen in Figures 1 and 4. The free end of portion 17 is pivotally connected to the intermediate part of portion 16 by means of a pin 18 which extends through the opposite sides of portions 16 and 17.

A latch 19 is pivotally mounted on pin 20 in portion 17 adjacent its opposite end. Latch 19 is pivotally mounted intermediate of its ends with one end projecting from the open top portion thereof, and the opposite end extending through a recess 21 in the underside of portion 17. The ends of the latch 19 are shaped to form the hooks 22 and 23 whose bills project in opposite directions.

Portion 16, adjacent the tubular portion 14 has a pin 24 extending through its opposite sides and adapted to be engaged by the hook 22 which projects into the portion 16 when the hook is in a folded position as seen in Figure 3. The opposite end of portion 16 is provided with an outwardly projecting flange 25 on its underside to be engaged by the hook 23, as best seen in Figure 4, when the hook 11 is in an open position. A coil spring 26 is mounted on pin 20 and has one end in engagement with portion 17 and the opposite end engaging the latch 19 to urge the bills of the hooks 22 and 23 forward for engagement with pin 24 and flange 25. The recess 21 limits this forward movement, and the rounded portions of the hooks 22 and 23 will cause them to be retracted by engagement with pin 24 and flange 25, respectively, to permit the hooks to automatically engage these members when moved from an open to a closed position or conversely.

Handle 12 is provided with a recess 27 opening at its lower end to receive the free end of section 14 and with a metal collar 28 on its lower end. A recess 29 is formed adjacent the upper end of handle 12 to receive the bill 30 of hook 11, as best seen in Figure 3, when the device is in a folded position to form a shield for the pointed end thereof.

Aligned slots 31 are formed in collar 28, handle 12 and section 14, through which extends the threaded shank of a headed screw 32, which engages a threaded opening on a washer 33 to secure the washer to one end of a rod 34 mounted in the tubular portion of section 14. The opposite end of rod 34 projects through a washer 35 secured in the lower end of the tubular portion of section 14 to form a guide for the lower end of the rod 34, the upper end of which is guided by the washer 33 which is of sufficient size to move as a piston in the tube 14. A coil spring 36 is mounted on rod 34 with one end in engagement with a pin 37 and the opposite end with the inner side of washer 35 to normally hold the rod 34 in its retracted position as best seen in Figure 3, to prevent it from engaging the hook end 22 of latch 19.

As best seen in Figures 3 and 4 the shank end 38 of hook 11 is secured in the tubular end of section 15. A coil spring 39 is mounted on the pin 18, with its opposite ends in engagement with portions 16 and 17 to normally urge the sections 14 and 15 to an open position as seen in Figure 4.

From the foregoing it will be obvious that when the gaff hook 11 is in a folded position as best seen in Figure 3, the rod 34 may be projected by pushing the head of screw 32 toward the opposite end of the slot 31, thereby causing the end 40 of rod 34 to engage the outer side of hook 22 to force it downwardly out of engagement with pin 24. When latch 19 is thus released, spring 39 will be free to force section 15 to an extended position where the hook 23 will engage the flange 25, as heretofore explained, to rigidly hold the hook 11 in its open position. When it is desired to close the hook 11, the hook end 23 of latch 19 may be manually disengaged from flange 25, and the hook 11 moved to its closed position as seen in Figure 3, against the action of spring 39 causing hook 22 to engage pin 24 to retain the sections 14 and 15 in a closed position.

It will thus be seen that a novel construction of folding gaff hook has been provided containing a latch member 19 constructed to retain the device in an open or a closed position.

Various modifications and changes in the particular construction and arrangement of the parts as shown may obviously be made and are contemplated, since only a preferred form of the invention has been disclosed, and the right is reserved to make such changes and modifications as fall within the spirit and scope of the invention as defined by the appended claims.

I claim as my invention:

1. In a gaff hook, a shank formed of pivotally connected sections, and a latch member, having hooked ends, carried by one of said sections to engage spaced portions of the other section to retain the shank in an extended or folded position.

2. In a folding hook, a shank formed of pivotally connected sections, a hook secured to one end of said shank, spring means normally urging said shank to an open position, and a latch member having hooked ends carried by one of said sections for engagement with the other section to retain the hook in an extended or folded position.

3. A gaff hook comprising a shank formed of pivotally connected sections, spring means normally urging said sections to an extended position, a latch member pivotally connected intermediate of its ends to one of said sections and provided with hook portions at each end, and means on said other section to be engaged by said hook portions to retain the shank in an extended or folded position.

4. In a gaff hook a shank formed of pivotally connected sections, a handle secured to one end of said shank, a hook mounted in the opposite end of said shank, spring means normally urging said hook to an open position, a spring actuated latch member carried by one of said sections to engage portions of said other section to retain said hook in an extended or folded position.

5. A gaff hook comprising a folding hook, means normally urging said hook to an open position, a spring actuated latch member pivotally connected intermediate of its ends and provided with hook ends to retain said hook in an extended or folded position, and a plunger to engage said latch member to release said hook from a folded position.

6. In a folding gaff hook, a shank formed of pivotally connected sections, a hook extending from one end of said shank, a handle secured to the opposite end thereof and provided with a recess, said sections being foldable to cause the bill of said hook to extend into said recess, a latch member carried by one of said sections and having hook ends to engage means on said other section to retain the hook in an extended or folded position, a plunger operable to disengage said latch when the hook is folded, and spring means to move said hook to an extended position.

7. A gaff hook comprising a shank formed of pivotally connected sections, a hook extending from one end thereof, a handle mounted on the opposite end and provided with a recess, a latch member pivotally mounted intermediate of its ends on one of said sections and having hook ends to engage means on the other section to retain the hook in an extended or folded position, the bill of said hook extending into said recess when folded, and a rod slidably mounted in said shank and manually operable to engage said latch to release the hook from a folded position.

8. An article of the class described comprising a shank formed of pivotally connected sections, a latch member pivotally mounted intermediate of its ends in one of said sections and projecting outwardly from said section in opposite directions, and hooks formed on the opposite ends of said latch member for engagement with portions of said other section to retain said shank in a folded or extended position.

9. A gaff hook comprising pivotally connected folding sections, a latch member pivotally mounted intermediate of its ends on one of said sections and projecting outwardly therefrom in opposite directions, and hooks formed on the opposite ends of said latch member and extending in opposite directions to each other to releasably engage portions of said other section to retain the gaff hook in an extended or folded position.

10. A folding gaff hook comprising a stem formed of pivotally connected sections, a latch member pivotally connected to one of said sections and disposed at right angles thereto, hooks formed on the opposite ends of said latch member, and means on said other section engageable by said hooks for retaining said sections in an extended or folded position.

11. A device as in claim 10 comprising a plunger slidably mounted in one of said sections and operable to actuate said latch member to release said sections from a folded position.

LOUIS H. DARLING.